United States Patent
Smith

(10) Patent No.: US 10,648,575 B2
(45) Date of Patent: May 12, 2020

(54) ELECTRO-HYDRAULIC PRESSURE REDUCING AND RELIEVING VALVE WITH FLOW FORCE CONTROL FOR LARGE FLOW CAPACITY

(71) Applicant: Prince Industries, Inc., Carol Stream, IL (US)

(72) Inventor: David Paul Smith, Wilmington, IL (US)

(73) Assignee: PRINCE INDUSTRIES, INC., Carol Stream, IL (US)

( * ) Notice: Subject to any disclaimer, the term of this patent is extended or adjusted under 35 U.S.C. 154(b) by 0 days.

(21) Appl. No.: 14/062,386

(22) Filed: Oct. 24, 2013

(65) Prior Publication Data

US 2014/0116551 A1    May 1, 2014

Related U.S. Application Data

(60) Provisional application No. 61/718,172, filed on Oct. 24, 2012.

(51) Int. Cl.
| | |
|---|---|
| F16K 11/04 | (2006.01) |
| F16K 27/00 | (2006.01) |
| F16K 11/07 | (2006.01) |

(52) U.S. Cl.
CPC .......... *F16K 11/04* (2013.01); *F16K 11/0716* (2013.01); *F16K 27/003* (2013.01); *Y10T 137/8671* (2015.04)

(58) Field of Classification Search
CPC .... F16K 11/0716; F16K 11/04; F16K 27/003; F16K 27/048; F16K 31/0613;
(Continued)

(56) References Cited

U.S. PATENT DOCUMENTS

| 115,296 | A | * | 5/1871 | Forbes | .................. | B62D 5/097 |
|---|---|---|---|---|---|---|
| | | | | | | 137/625.24 |
| 344,724 | A | * | 6/1886 | Crosby | .................. | F15B 13/04 |
| | | | | | | 137/625.38 |

(Continued)

FOREIGN PATENT DOCUMENTS

| DE | 19934846 | 1/2001 |
|---|---|---|
| DE | 102009008056 | 8/2010 |

(Continued)

OTHER PUBLICATIONS

PCT, Notification of Transmittal of the International Search Report and the Written Opinion of the International Searching Authority, or the Declaration, in International application No. PCT/US2013/066536, dated Mar. 21, 2014.

(Continued)

*Primary Examiner* — Craig J Price
(74) *Attorney, Agent, or Firm* — Barich IP Law Group

(57) ABSTRACT

A hydraulic valve is provided that includes an interior spool and a surrounding cage. A supply port and a return port are connected to the cage and the interior of the cage is in fluid communication with a control port. The interior spool is positioned between an on and off position using a solenoid and a spring. In the off position, slots in the spool and cage align to place the return port in fluid communication with the interior of the spool. Conversely, in the on position, different slots in the spool and cage align to place the supply port in fluid communication with the interior of the spool.

7 Claims, 15 Drawing Sheets

(58) Field of Classification Search
CPC ........... F16K 31/0624; Y10T 137/8671; Y10T 137/86622; Y10T 137/8667; Y10T 137/599; Y10T 137/86694; Y10T 137/6065; F15B 13/0402; F01L 1/34; F01L 1/3442; F01L 2001/3443; F01L 2001/34426
USPC ............ 137/625.69, 625.38, 625.37, 625.34, 137/625.35
See application file for complete search history.

(56) References Cited

U.S. PATENT DOCUMENTS

| | | | | |
|---|---|---|---|---|
| 2,725,076 | A * | 11/1955 | Hansen | F16K 15/063 137/107 |
| 3,650,295 | A * | 3/1972 | Smith | F16K 11/207 137/614.17 |
| 3,747,639 | A * | 7/1973 | Eickmann | F03C 1/0438 137/625.24 |
| 3,819,307 | A | 6/1974 | Uppal | |
| 4,000,878 | A * | 1/1977 | Vick | F16K 3/34 137/501 |
| 4,023,593 | A * | 5/1977 | Piccardo | F15B 13/0431 137/625.64 |
| 4,643,225 | A * | 2/1987 | Imhof | F15B 13/0402 137/596.17 |
| 4,838,954 | A * | 6/1989 | Perach | F16H 61/0251 137/625.17 |
| 4,958,704 | A * | 9/1990 | Leiber | F16F 9/368 188/267 |
| 5,065,793 | A * | 11/1991 | Stephenson | B62D 5/07 137/596.13 |
| 5,253,676 | A | 10/1993 | Craig | |
| 5,284,220 | A * | 2/1994 | Shimizu | F15B 13/0402 137/330 |
| 5,848,613 | A * | 12/1998 | Sakaguchi | F15B 13/0402 137/625.65 |
| 5,887,621 | A * | 3/1999 | Doll | F16F 9/46 137/625.38 |
| 6,095,177 | A * | 8/2000 | Machat | F15B 13/0402 137/116.3 |
| 6,315,210 | B1 * | 11/2001 | Kline | G05D 23/134 236/12.2 |
| 6,688,334 | B2 * | 2/2004 | Kawamura | F16K 31/0613 137/625.65 |
| 7,617,700 | B2 * | 11/2009 | Lamb | G05D 23/022 165/297 |
| 7,766,041 | B2 * | 8/2010 | Tackes | F16K 3/262 137/625.3 |
| 8,006,718 | B2 * | 8/2011 | Hamaoka | F01L 1/34 137/315.04 |
| 8,839,820 | B2 | 9/2014 | Hoppe | |
| 8,991,428 | B2 * | 3/2015 | Holmes | F16K 31/0613 137/625.65 |
| 9,027,598 | B2 * | 5/2015 | Schneider | F16K 11/07 137/625.35 |
| 9,127,694 | B2 * | 9/2015 | Greeb | F15B 13/0406 |
| 9,297,474 | B2 * | 3/2016 | Suzuki | F16K 31/0675 |
| 9,410,536 | B2 * | 8/2016 | Lamb | F03G 7/06 |
| 2006/0081298 | A1 * | 4/2006 | Segi | F16K 31/0613 137/625.64 |
| 2007/0246112 | A1 | 10/2007 | Aranovich | |
| 2009/0057588 | A1 | 3/2009 | Patrick | |
| 2009/0256091 | A1 * | 10/2009 | Nordstrom | F16K 31/0613 251/129.15 |
| 2010/0301248 | A1 | 12/2010 | Yamamoto | |
| 2012/0000550 | A1 | 1/2012 | Hunnicutt | |
| 2013/0333773 | A1 * | 12/2013 | Holmes | F16K 31/0613 137/487.5 |

FOREIGN PATENT DOCUMENTS

| | | | |
|---|---|---|---|
| EP | 1197692 | 4/2002 | |
| GB | 2104249 A * | 3/1983 | .......... F15B 13/0442 |
| JP | 2009-216164 | 9/2009 | |

OTHER PUBLICATIONS

English translation of JP 2009-216164.

* cited by examiner

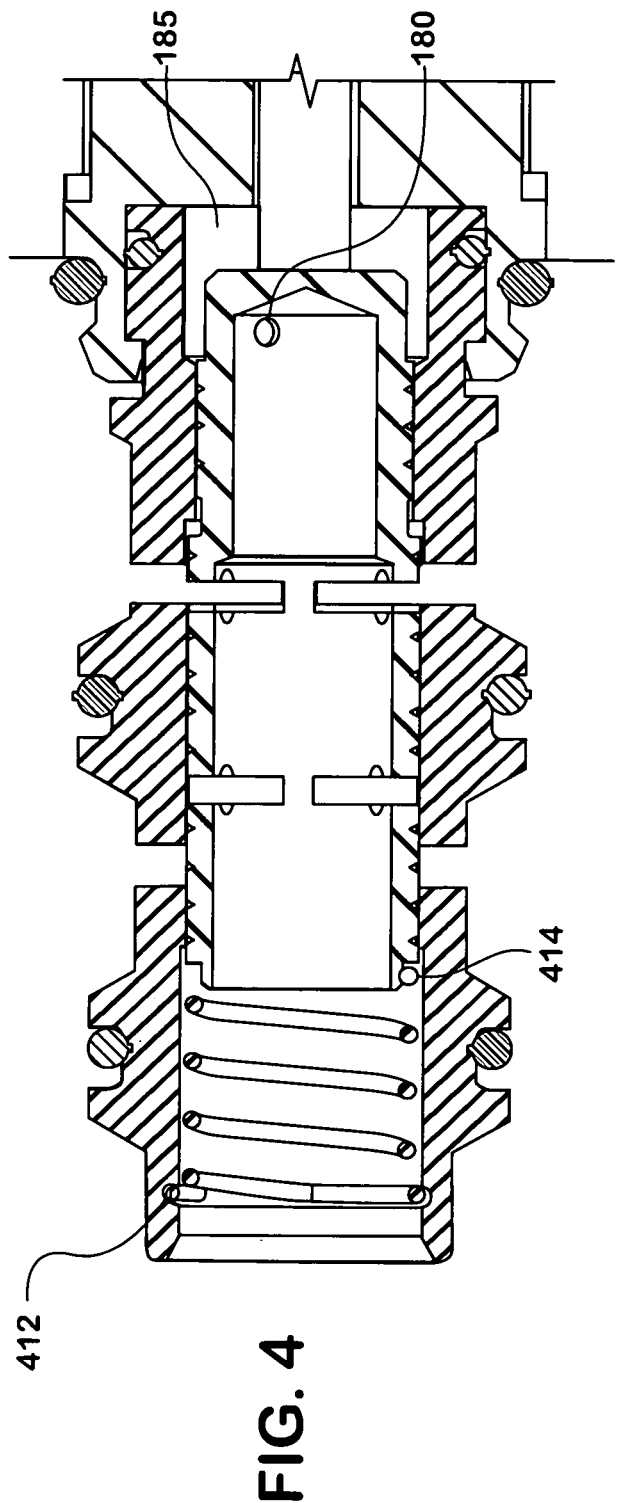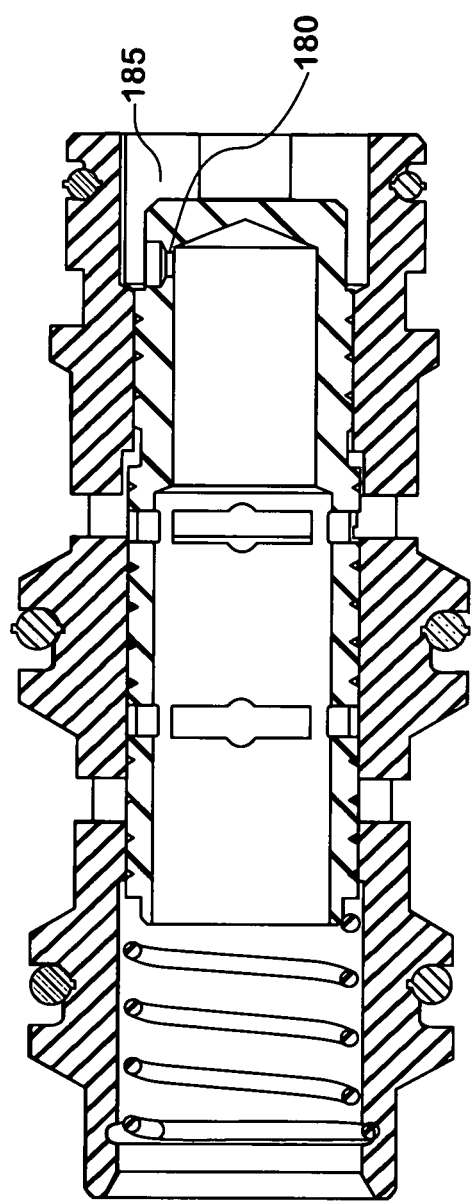
FIG. 4
FIG. 5

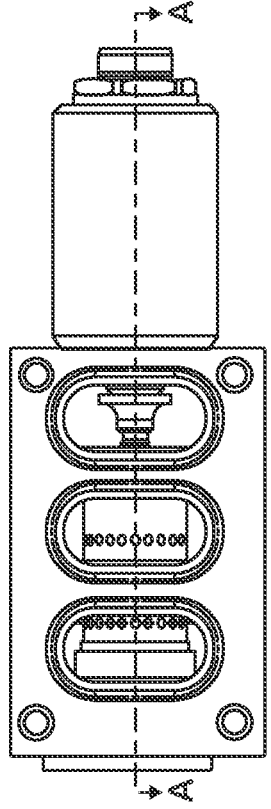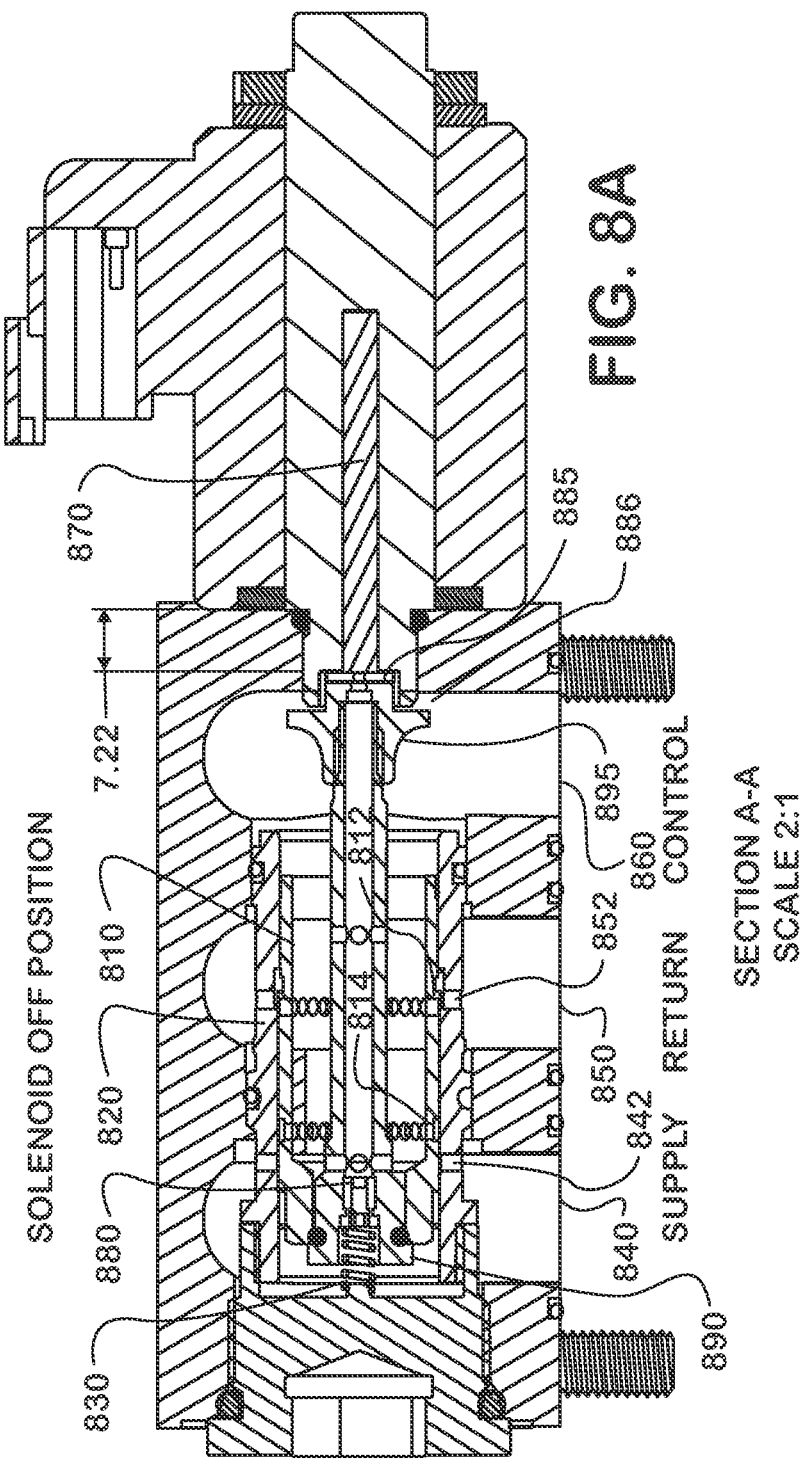

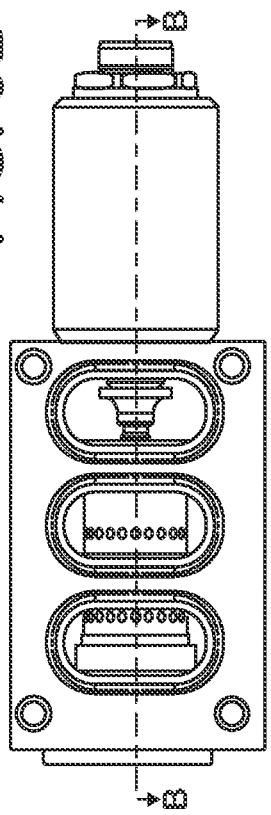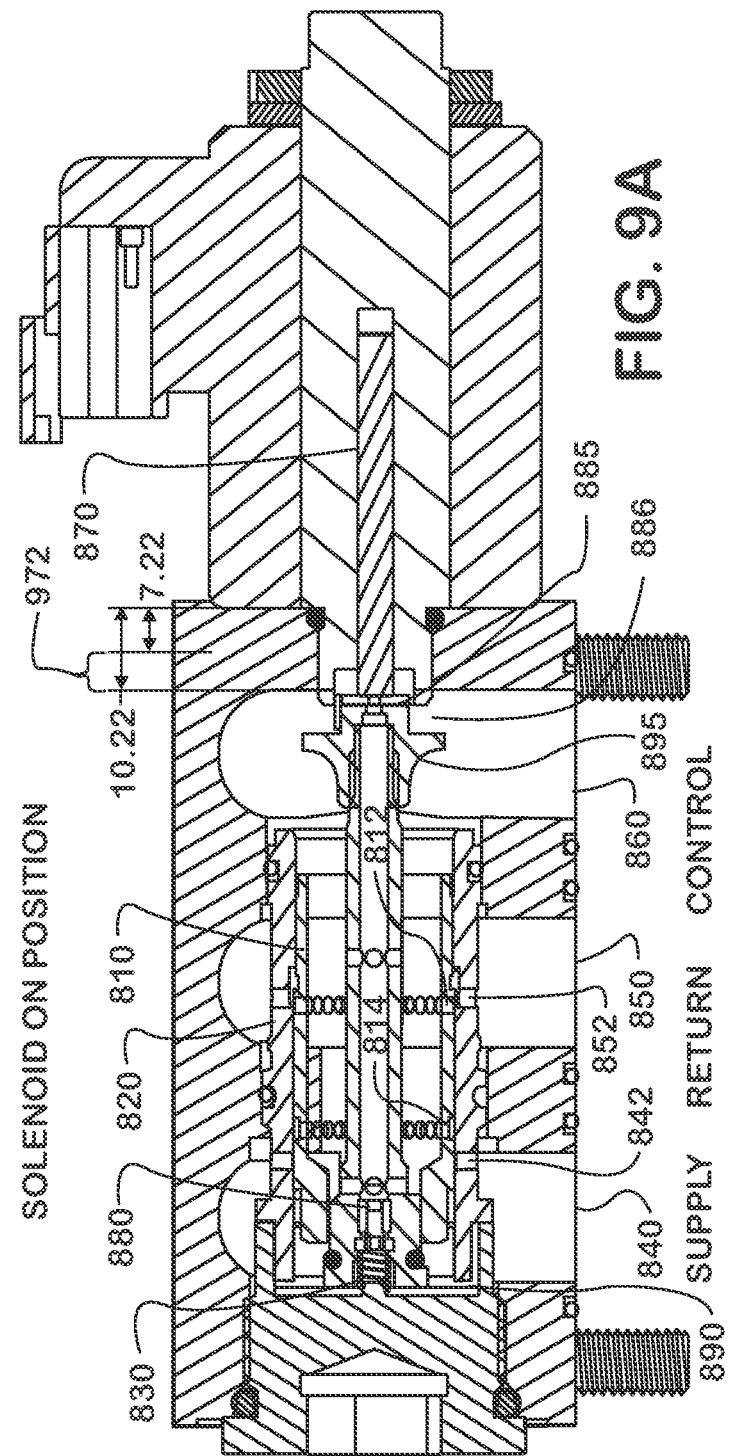

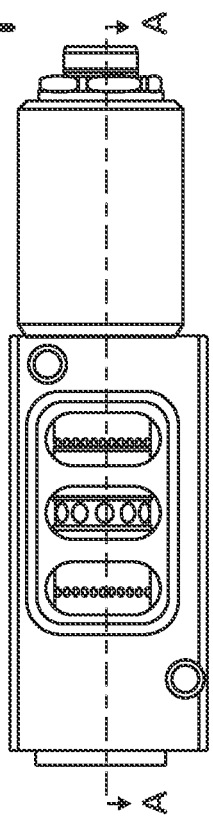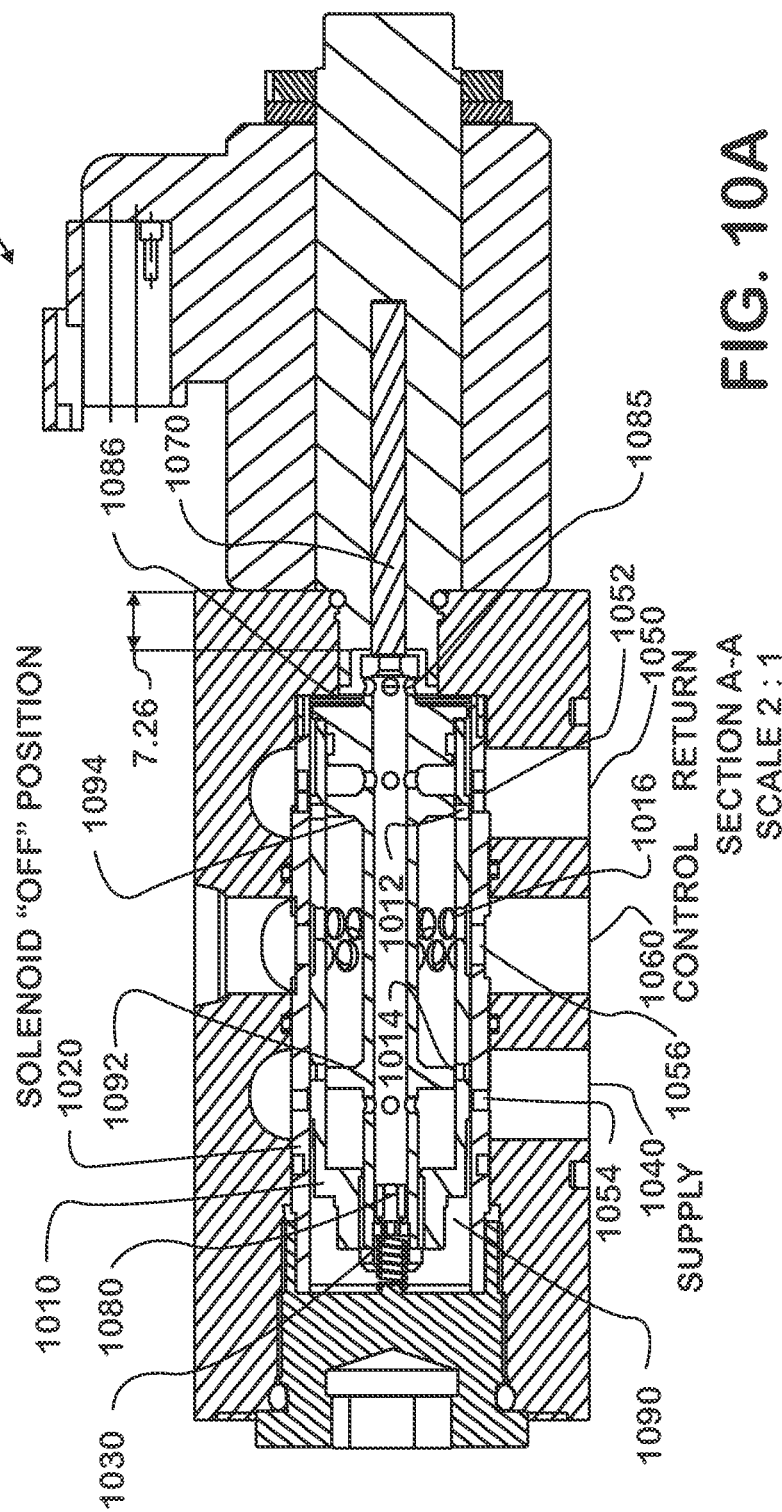

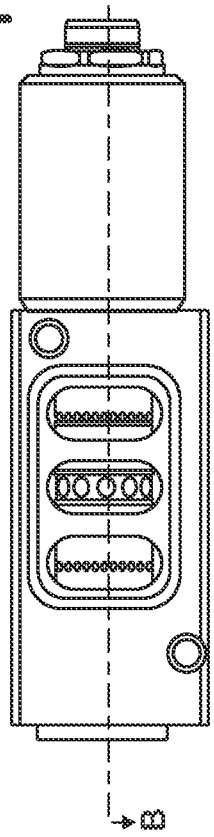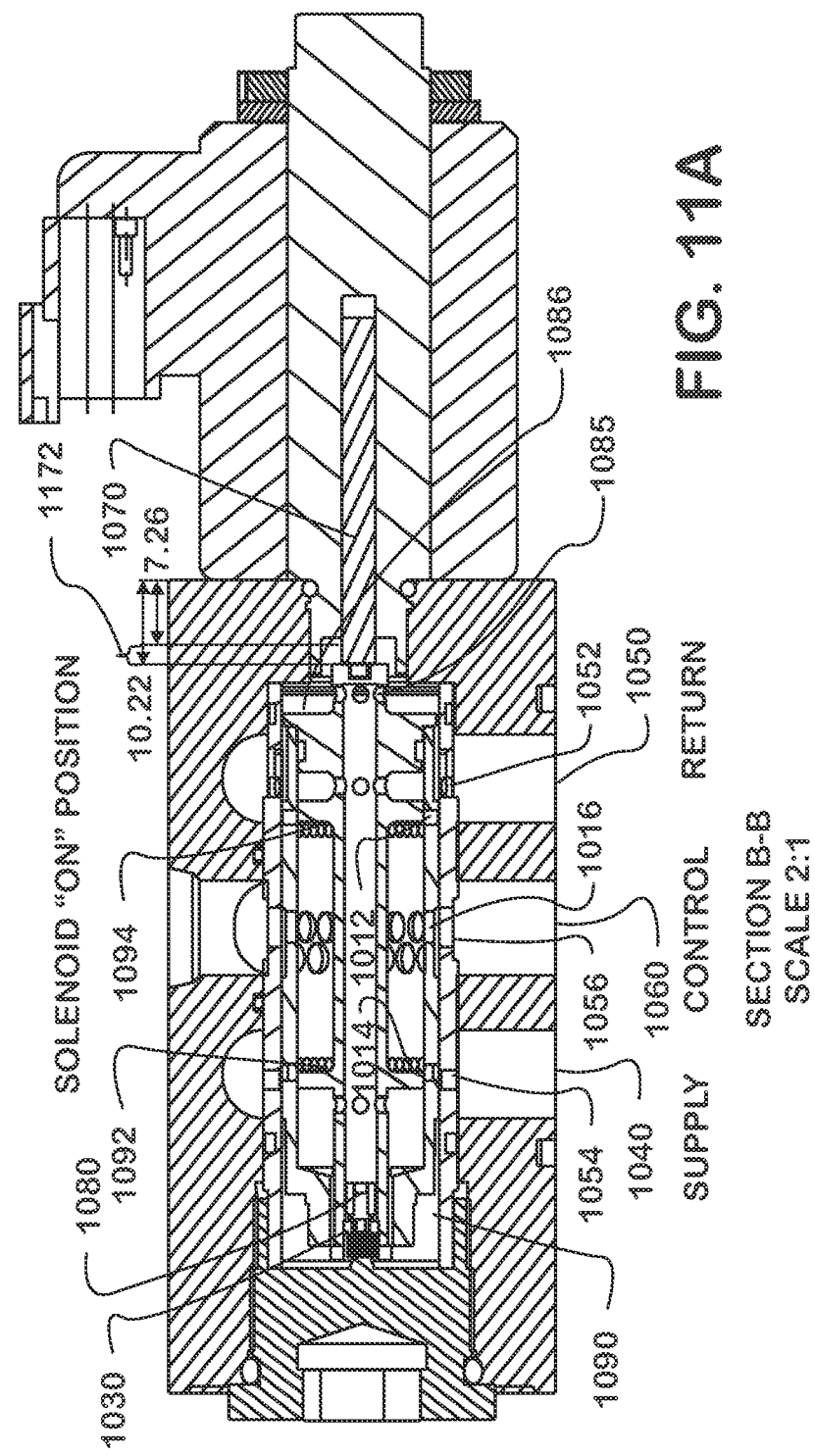

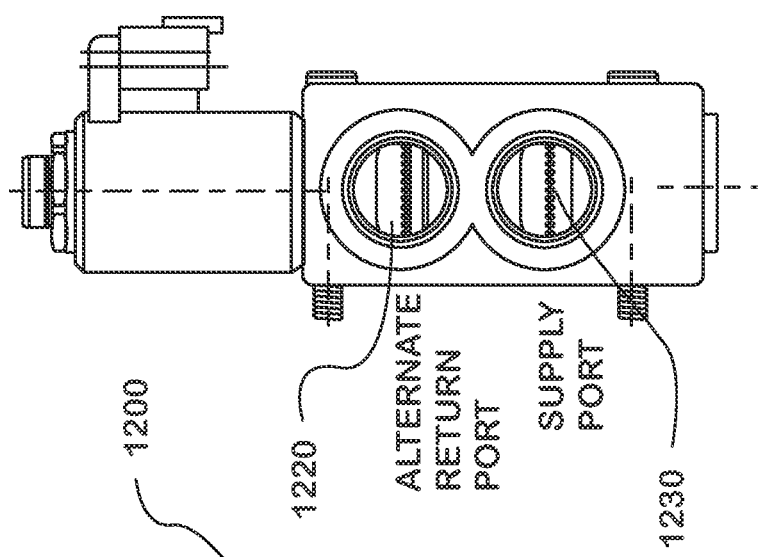
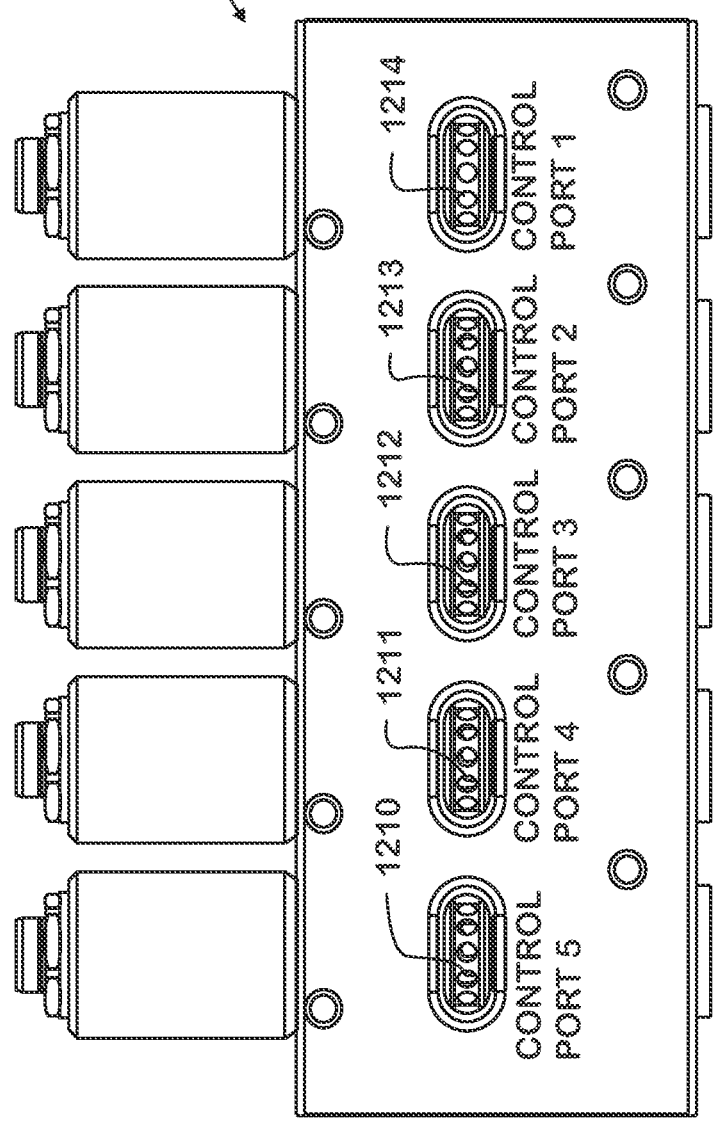

ELECTRO-HYDRAULIC PRESSURE REDUCING AND RELIEVING VALVE WITH FLOW FORCE CONTROL FOR LARGE FLOW CAPACITY

CROSS-REFERENCE TO RELATED APPLICATIONS

The present application claims the benefit of U.S. Provisional Application No. 61/718,172, filed Oct. 24, 2012, entitled "Electro-Hydraulic Pressure Reducing and Relieving Valve with Flow Force Control for Large Flow Capacity" which is hereby incorporated by reference in its entirety.

BACKGROUND OF THE INVENTION

The present invention generally relates to an improved valve. More particularly, the present invention relates to a valve having a large valve capacity and electro-hydraulic proportional pressure reducing and relieving abilities.

There are valves with stepped bores such as those shown in U.S. Pat. Nos. 5,876,185 and 6,125,886. In these patents the push is reduced by the smaller feedback area from a differential area formed by the stepped bore. However, the flow and response of these valves is limited due to flow forces that tend to shut the valve. In various applications ranging from pump controls to pilot operation of a larger direction control spool to even a direct cylinder actuation, the size of the application is determined by the flow capacity of the valve.

BRIEF SUMMARY OF THE INVENTION

One or more embodiments of the present invention provide a hydraulic valve that includes an interior spool and a surrounding cage. A supply port and a return port are connected to the cage and the interior of the cage is in fluid communication with a control port. The interior spool is positioned between an on and off position using a solenoid and a spring. In the off position, slots in the spool and cage align to place the return port in fluid communication with the interior of the spool. Conversely, in the on position, different slots in the spool and cage align to place the supply port in fluid communication with the interior of the spool.

BRIEF DESCRIPTION OF THE SEVERAL VIEWS OF THE DRAWINGS

FIGS. 4 and 5 illustrate rotated sectional views of the valve of FIG. 1 with the valve in the "off" position.

FIGS. 8A and 8B illustrate an alternative embodiment of a valve according to an embodiment of the present invention.

FIGS. 9A and 9B illustrate the valve of FIG. 8A in a solenoid on position.

FIGS. 10A and 10B illustrate an alternative embodiment of a valve according to an embodiment of the present invention.

FIGS. 11A and 11B illustrate the valve of FIG. 10A in a solenoid on position.

FIGS. 12A, 12B, 13A, 13B and 14 illustrate an alternative embodiment of a multiple valve system according to one embodiment of the present invention.

DETAILED DESCRIPTION OF THE INVENTION

Figure 1:
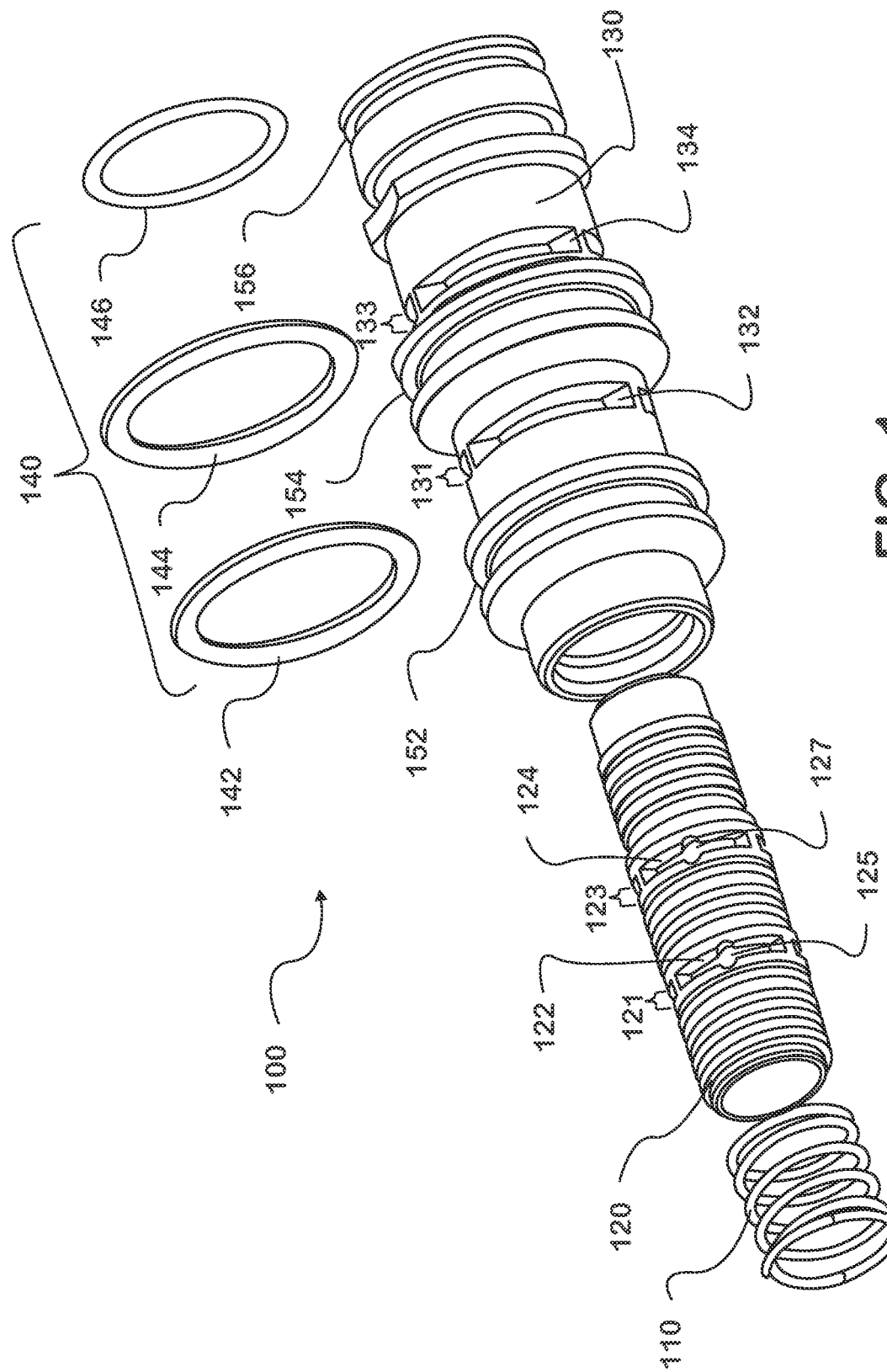
FIG. 1 illustrates an exploded view of an electro-hydraulic pressure reducing and relieving valve with flow force control according to an embodiment of the present invention.

FIG. 1 illustrates an exploded view of an electro-hydraulic pressure reducing and relieving valve with flow force control 100 according to an embodiment of the present invention. The valve 100 includes a spring 110, a spool 120, and a cage 130. The spring is preferably a snap-in spring that snaps into place during installation as further described below.

The spool 120 includes a spool first slot position 121 and a spool second slot position 123. At the spool first slot position 121 and the spool second slot position 123, there are three slots arranged around the exterior of the spool 120, each slot encompassing an angle of about 90-120 degrees around the exterior of the spool 120. At the spool first slot position 121, there is shown a spool first slot 122. At the spool second slot position 123, there is shown a spool second slot 124. The spool first slot 122 includes a first slot center hole 125 and the spool second slot 124 includes a second slot center hole 127, wherein the spool first slot 122 includes a long side and a short side, and wherein the first slot center hole 125 has an outermost diameter larger than the width of the short side.

Any number of narrow slots and holes can be configured to produce the desired area curves for an application. For example, alternative embodiments may include 2, 3, 4, 5, 6 or more slots for one or both of the spool and cage. For example, two slots may increase the total open area but may reduce the bending strength of the spool or cage. A design with three slots may offer the best bending strength without significant reduction in open area. However, a design with four slots may be symmetric and might be easier to manufacture and inspect. Other numbers of slot such as six and eight may also be symmetric.

Additionally, in one or more embodiments, the holes inside the slots may add to fine modulation. For example, multiple holes may add to manufacturing cost but may be used to make a smooth transition from metering on hole to metering on the edge of the slot. The desired transition may vary depending on the application for which the valve is being designed for. For example, for an automotive clutch application it may be desirable to have one hole in one of three slots. Conversely, in an implement main valve application, it may be more desirable to have greater fine control. Thus, it may be preferable to have a design with one hole in each slot, but with the size of each hole having different diameters to allow for a smooth transition in area from hole to slots.

Further, the spool and cage may have differing configurations of spools and/or holes. Also, slots or holes may be of differing sizes on the spool and/or cage. Also, one or more holes may be outside the slots. Additionally, there may be a differing number of holes in different slots. Further, the hole size may vary from hole to hole.

The cage 130 includes a cage first slot position 131 and a cage second slot position 133. At the cage first slot position 131 and the cage second slot position 133, there are three slots arranged around the exterior of the cage 130, each slot encompassing an angle of about 90-120 degrees around the exterior of the cage 130. At the cage first slot position 131, there is shown a cage first slot 132. At the cage second slot position 133, there is shown a cage second slot 134. This embodiment shows three slots in position 131 and three slots in position 133, but any number of slots and holes can be configured. Additionally, the cage 130 includes a first seal location 152, a second seal location 154, and a third seal location 156.

The seals 140 are installed into their respective locations on the cage 130 with the first seal 142 being positioned in the first seal location 152, the second seal 144 being positioned in the second seal location 154, and the third seal 146 being positioned in the third seal location 156. In an alternative embodiment, the seals and grooves may be replaced by a rigorous control of fitting or spacing between the cage and a surrounding structure. The cage may also be coated so that a large portion of the exterior of the cage forms a seal with the surrounding structure.

Figure 2:
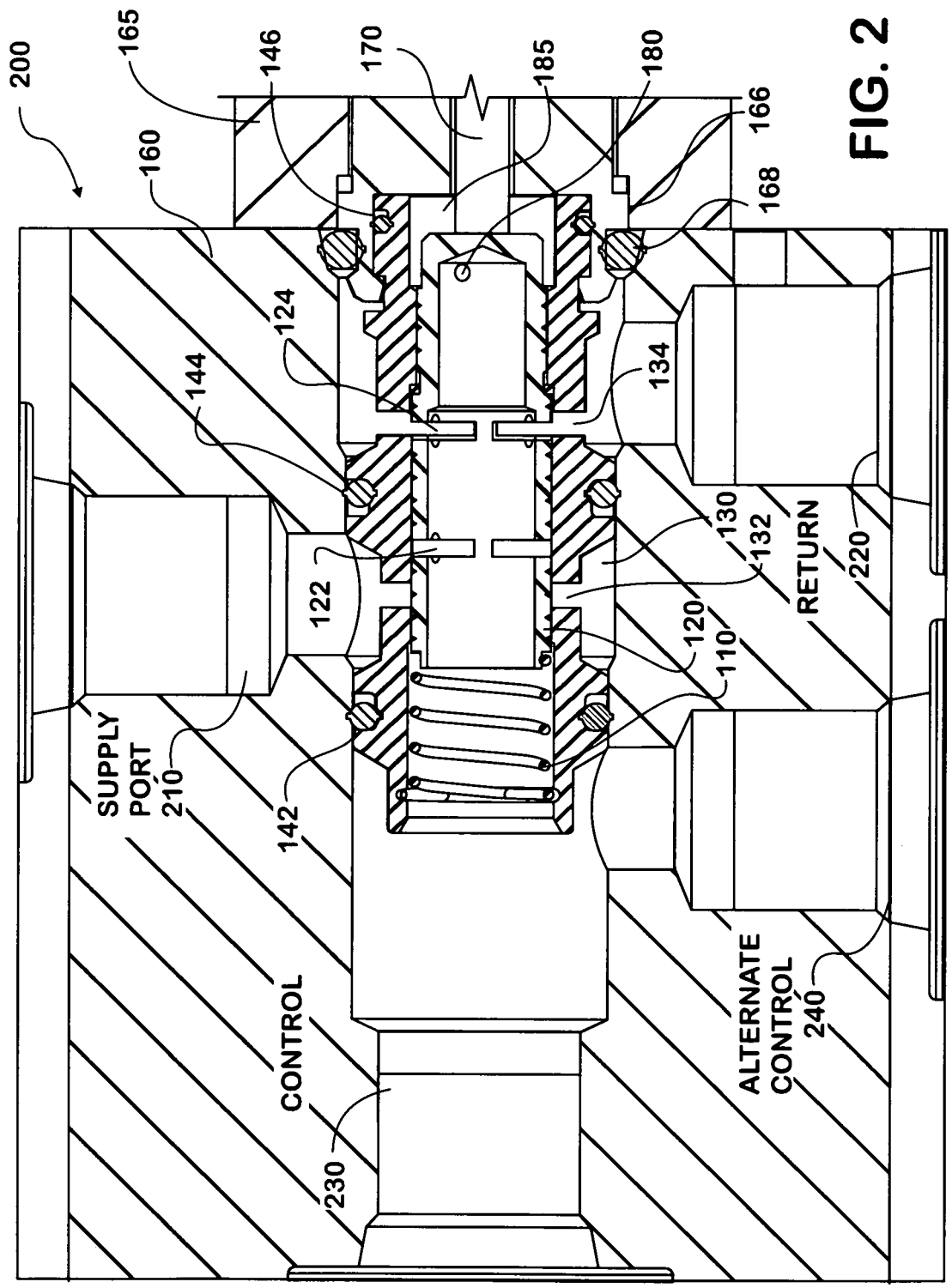
FIG. 2 illustrates a sectional view of the valve of FIG. 1 in an "off" position in an exemplary installation.

FIG. 2 illustrates a sectional view 200 of the valve 100 of FIG. 1 in an "off" position in an exemplary installation. As shown in FIG. 2, the spring 110, spool 120, and cage 130 are present. Further, the spool first slot position 121, spool second slot position 123, cage first slot position 131, and cage second slot position 133 are also shown. Additionally, the first seal 142, second seal 144 and third seal 146 have been installed into their respective locations on the cage 130. Also shown is a dampening orifice 180 to the right end of the spool and inner pressure balanced areas 185.

In alternative embodiment the cage is directly integrated or formed as part of the surrounding casing 160.

The valve 100 has been positioned in a valve casing 160 into which a supply port 210, return port 220, control system port 230, and alternate control system port 240 have been placed.

Also, the valve casing 160 has been connected to an electro-mechanical solenoid actuator 165 that includes a cage interlocking structure 166 and an interlocking seal 168, and a pin 170.

As shown in the "off" position of FIG. 2, the spool second slot 124 and cage second slot 134 are in alignment, but the spool first slot 122 and the cage first slot 132 are not in alignment. This allows fluid to pass from the return port 220 through the spool second slot 124 and cage second slot 134 and be in fluid communication with fluid from the control system 230.

The control pressure through slots in position 123 enters the inside of the spool 120.

This control pressure communicates through the dampening orifice 180 to the right end of the spool and on to the inner pressure balanced areas 185 present in the known solenoid actuator 165. This embodiment is shown with a push style pin 170 but a pull style pin and solenoid may be alternatively employed.

Figure 3:
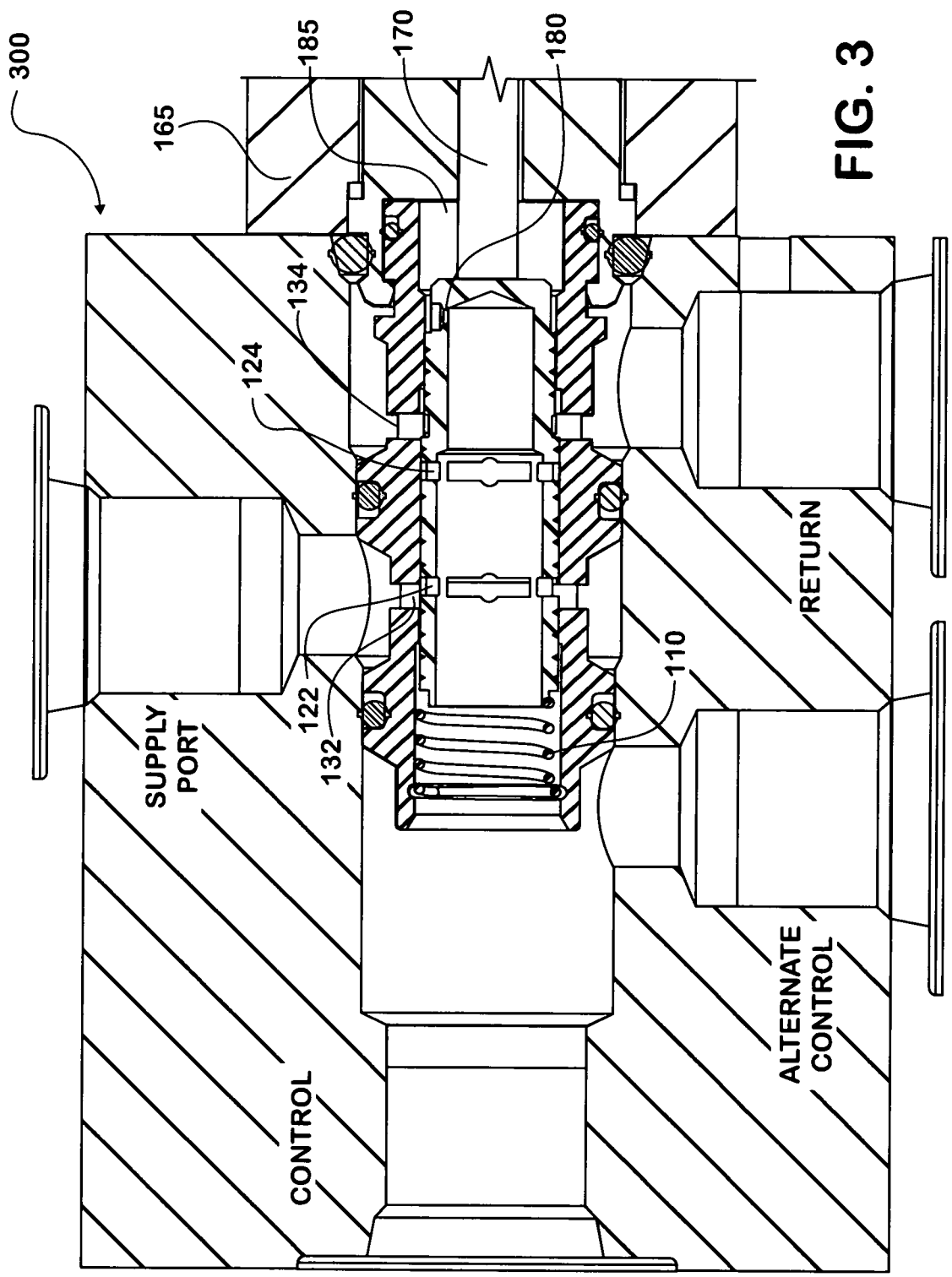
FIG. 3 is similar to FIG. 2, but illustrates a sectional view of the valve in an "on" position in an exemplary installation.

FIG. 3 is similar to FIG. 2, but illustrates a sectional view 300 of the valve 100 in an "on" position in an exemplary installation. FIG. 3 section view is taken at angle through the center of the orifice 180. FIG. 3 includes all of the elements of FIG. 2, but at shown in FIG. 3, the spring 110 is compressed. Also, the spool first slot 122 and the cage first slot 132 are now in alignment while the spool second slot 124 and cage second slot 134 are no longer in alignment. Also shown is a dampening orifice 180 to the right end of the spool and inner pressure balanced areas 185.

Thus, as opposed to the "off" position mentioned above in FIG. 2, in the "on" position of FIG. 3, fluid passes from the supply port 210 through the spool first slot 122 and center hole 125 and the cage first slot 132 and is in fluid communication with fluid from the control system 230.

FIGS. 4 and 5 illustrate rotated sectional views of the valve 100 of FIG. 1 with the valve in the "off" position.

This shows that the webs between spool slots 122 and 124 and the webs between cage slots 132 and 134 may all be aligned. The snap in spring 110 may be used to hold this angular alignment of the spool and cage webs. Alignment of the webs maximizes the desired open area, and maintaining web alignment insures that any metering areas such as from holes 125 and 127 are not blocked by the webs.

Figure 6:
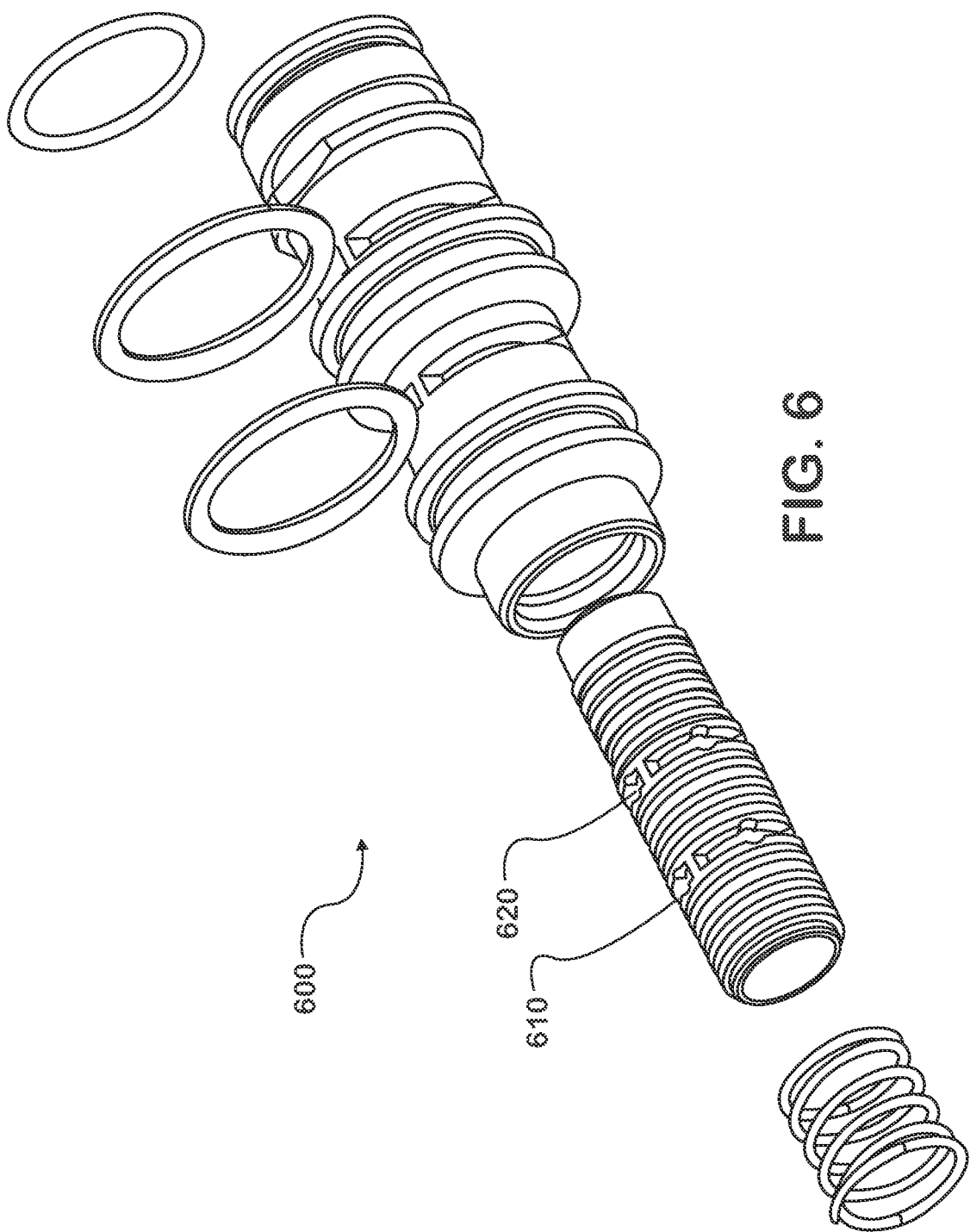
FIG. 6 illustrates an alternative embodiment of the valve generally similar to that of FIG. 1, but also including a spool first slot off center hole and a spool second slot off center hole.

FIG. 6 illustrates an alternative embodiment of the valve 600 generally similar to that of FIG. 1, but also including a spool first slot off center hole 610 and a spool second slot off center hole 620. The off center holes allow the spool to rotate in the cage and not block all the metering holes. Thus in this alternative embodiment the webs between the slots in the spool and the cages as shown in FIGS. 4 and 5 do not need to be angularly aligned for the hole areas 610 and 620 to be active and not blocked by the webs.

Figure 7:
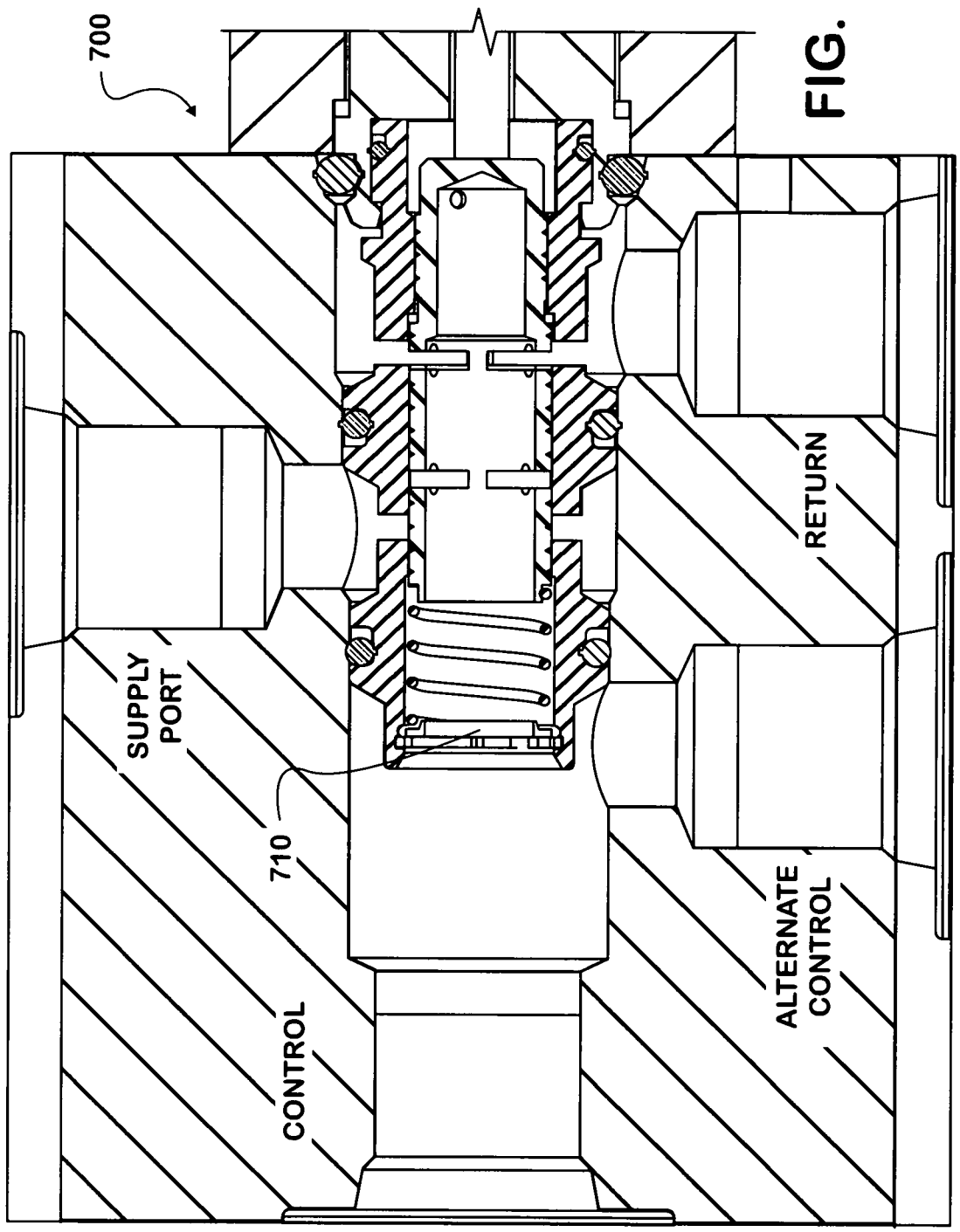
FIG. 7 illustrates an alternative embodiment of the valve generally similar to that shown in FIG. 2, but also including a spring retainer.

FIG. 7 illustrates an alternative embodiment of the valve 700 generally similar to that shown in FIG. 2, but also including a spring retainer 710. The spring retainer 710 is preferably made from bearing material. Bearing materials such as bronze are known to reduce friction of materials in contact under a given normal load. Retainer 710 may be sized such that the flow forces through the metering areas may rotate the spool inside the cage such the webs stay aligned or actually re-align during valve operation.

The embodiments shown in FIGS. 1-7 reduce the closing flow forces by having nearly radial flow configured slots. This minimizes for most applications the need for transferring the flow forces to an end chamber and minimizes the need for an additional flare element to compensate for net closing flow forces.

Besides directing flow nearly radially and thus significantly reducing closing flow forces, slots are faster and thus less costly to machine. Any number of slots may be configured in the spool and cage or body elements.

The preferred embodiment is three slots in the spool and 3 similar slots in the cage or body, as shown in FIGS. 1-7. Three slots give the parts additional bending strength as compared to elements with only 2 slots. This bending strength is typically needed for handling and assembly of the parts. More than three slots such as four slots in each position increases the web areas between slots thus reducing the total open area possible.

Slots metering to slots typically have almost the same area gain as a land to land condition. This large area gain is typically too much for metering requirements on most valve applications. To allow a fine metering low area gain portion of the valve holes may be configured inside the slots. The lower area gain shown by holes 125 and or 610 are used for modulation of the proportional pressure reducing function. The holes 127 and or 620 are used for modulation of the relieving function.

Typically during machining a hole machined inside of a slot the drill element will bend reducing hole position accuracy. This is addressed by centering the drill center with the slot center. Another method is to use side cutting end mills for the hole such that the side plunge depth may be controlled.

Slots however present a functional concern since the spool and cage element may rotate relative to each other and vary the expected net open area of the valve. Slots need to have a web portion between the slots that block flow. If the spool element rotates relative to the cage or body element then the net open area is reduced.

This change in open area is a prevented by several methods, including: 1) a snap-in spring that holds the angular alignment (as shown in FIGS. 4 and 5), 2) a bearing material spring retainer that allows flow forces to align the web portions and (as shown in FIG. 7) 3) a hole configuration in conjunction with the slots that reduces the area change when there is relative angle orientation change and (as shown in FIG. 6) 4) a pin in a groove or other known method of preventing relative rotation and 5) no spring at all with flow forces aligning the spool and cage webs.

The preferred method is the snap-in spring. This holds the spool and cage so that the webs between the slots may be aligned. The snap-in spring also eliminates the spring retainer and performs the snap ring retainer function. Also the snap-in spring may be quickly assembled by axially compressing the parts until both ends of the spring snap in place. The in-active coils of the spring are used for the snap-in functions. This reduces relative friction in the active spring deflection range. Also the friction is reduced by the snap-in feature centering the spring such that the active coils don't contact the bore of the cage. The cost of controlling the in-active spring coils sizes for the snap-in function is minimal since this may be programmed into the spring winding program and does not introduce any additional manufacturing operations.

In a preferred embodiment, the width of the slot is nearly the same as the radial flow path. This insures at near maximum flow the flow path is nearly radial. Since the flow is radial the net closing flow forces are dramatically reduced as compared to a spool with metering edges and lands that has a flow path that is not nearly radial but at some angle such as 58 degrees from the axis of the spool.

This pressure reducing and relieving valve meters pressure up by controlling area from supply to control. Control pressure is on both ends of the spool. The solenoid end has control pressure go through the dampening orifice. This orifice is sized in known manor for response and stability of that application.

This spool is light weight so the orifice may be large allowing a smooth pressure modulation curve at cold oil. This embodiment shows a 9 mm large bore with a 1.4 mm dampening orifice. Normally on a heavy spool the dampening needs to be 0.8 mm on a 9 mm bore application. This means that the dampening orifice is 3 times larger and is made with a short length such that the cold oil curve is smooth without sudden undesired jump to start pressures.

The bore is stepped and so is the spool. The loose fit between the cage bore and the spool on the larger left end does not need to be the same loose fit as on the smaller diameter right end as shown in FIGS. 1-7. The diametral fits may be set to control both leakage and reduce sliding friction as needed in a valve application. The slots may create lobes on the spool. These lobes may help lubricate the spool and create a smooth operation. The leakage increase from the lobes may be adjusted by controlling the loose fit tolerances.

The spool net area on the left is larger than that on the right end (the end with push type of solenoid attached). So the pressure into the control produces a feedback force to the solenoid. This allows the pressure to be controlled proportional to the solenoid force input. The return spring insure the spool returns to a desired vented condition when no solenoid force input is given. The return spring also provide a spring rate constant that is known to stabilize operation. When flow is needed in the output control passage, then the stabilized position has more open area from supply to control.

The solenoid may be designed to have nearly constant force for given current input over of a given stroke range. This gives the valve a large flow capacity and a flat regulation curve. The 9 mm large bore views shown have 6 bar pressure drop at 30 lpm for both pressure reducing and relieving modes of operation.

Relieving mode of operation is needed when the control pressure overshoots the demanded control pressure either due to a dynamic spool motion or from a flow source external from the valve and into the control port. In either case the excessive control pressure pushes the spool back towards the solenoid. This then closes the supply pressure and opens area from control to return through slots in position 124 and holes 127 and or 620.

If a control pressure goes above the demanded pressure the spool starts to shift towards more open area to return. This then acts like a single stage relief valve. The solenoid force then sets the pressure for the control pressure relief. The solenoid force over the stroke range may be nearly linear. This allows this single stage relief to have a flat regulation curve. Typical applications such as a clutch control, this relieving function allow the demanded control pressure raise rate to be nearly a step function or actually be a step function. This is because the control pressure may be limited by this relieving function with a flat and response regulation.

Obtaining a large flow capacity valve requires a much smaller coil and solenoid. This is because the push is reduced by the stepped bore feedback, plus the nearly radial flows from the slots with metering holes reduce the closing flow force under the high flow conditions. This reduces the current driver size and the system heat that typically reduce the life and performance of proportional solenoids. There is basically just a spool and cage (or body in applications where a cage is not needed). The spring may be eliminated on some solenoid applications. The cost of the nearly radial flow path open area is low cost due to fewer machine operations and less machine time is required producing the slots (as compared with multiple radial holes).

One or more embodiments of the present invention may be useful in a wide variety of applications including: construction equipment, automotive, aeronautical and industrial applications, or other applications that use proportional and on/off valves. These valves may be pressure control or area control devices. The flow forces in these valves limit the maximum flow usable in the various applications. The flow force reducing and lower cost manufacturing methods shown in one or more embodiments of the present invention are beneficial in these valve applications.

More specifically, construction equipment, material handling and automotive applications need valves that are cost and size competitive. Also the current driving systems are limited by the cost, size and heat of the current level needed.

The larger flow capacity offered by the present valve allows smaller solenoids to be used, thus holding down the size, heat and cost of the solenoid and the system current drivers. The cavity shown has the typical cavity configuration of: return, supply then control as configured on most automotive clutch, and pump control applications. This makes both the size and manifold configuration an easy replacement of typical automotive style EH proportional valves.

Construction equipment may eliminate stages of valves once the capacity is higher. Typical high flow capacity EH proportional valves need a pilot and a main stage. This invention is a single stage that increases response, improves stability and holds down the size and cost.

Also remote control on the actual pumps, motors and cylinders reduces the manifolds needed in a circuit, especially for material handling. Due to the smaller package size the EH valves of this invention can be configured remotely on the actual hydro-mechanical units (such as the control valve, pump, motor and cylinder).

The aeronautical applications also need valves that are cost effective. But aeronautical application have an added benefit of the lighter weight offered by the present valve. This is from both the reduced size solenoid and the reduced size and reduced number of parts of the high capacity single stage.

The industrial valve applications typically would benefit by the lower heat and longer life offered by the present valve. A typical clutch actuation needs large flow with no cold oil delay to fill the clutch followed by fine pressure modulation to prevent the discs from excessive slippage. Also smooth operation and fast response are also benefits offered by this invention for various valve applications mentioned above and for other applications known in various fields of art. The relatively large dampening orifice allows faster response with warm oil and no jump in start of pressure with cold oil.

FIG. 8A illustrates an alternative embodiment of a valve 800 according to an embodiment of the present invention. FIG. 8A shows a valve 800 having a sleeve spool 810, a cage 820, a spring 830, a supply port 840, a return port 850, a control port 860, and solenoid 870. The cage 850 includes a cage return port slot and/or hole 852 at a cage return port location and a cage supply port slot and/or hole 854 at a cage supply port location. The sleeve spool 810 includes a sleeve spool return port slot and/or hole 812 at a spool return port location and a sleeve spool supply port slot and/or location 814 at a spool supply port location. The term "hole" as used herein includes one or more slots and/or holes and/or a plurality of just holes and no slots. Also shown in FIG. 8 is an orifice 880, a left end spool chamber 890 right end spool chamber 886, and flow force flare element 895.

FIG. 8B illustrates a view of the "off" valve 800 looking into the supply port 840, return port 850, and control port 860.

FIGS. 8A and B illustrate the solenoid off position for the valve 800. In this position, the sleeve spool return port hole 812 and cage return port hole 852 at least partially overlap to allow fluid transfer through both the sleeve spool return port hole 812 and cage return port hole 852 so that the return port 850 and the interior of the valve are in fluid contact. Conversely, the sleeve spool supply port hole 814 and cage supply port hole 842 are not in alignment, so the interior of the valve and the supply port are not in fluid communication. Control pressure is communicated through orifice 880 to the larger area left end spool chamber 890. Control flow contacts flow force flare element 895. Control pressure is communicated through orifice 885 to the smaller area right end 886 of the spool which in this embodiment is essentially the same pressure as control port pressure 860.

FIG. 9A illustrates the valve 800 of FIG. 8A in a solenoid on position. As shown in FIG. 9A, the solenoid 870 has displaced the sleeve spool 810 by a solenoid displacement distance 972. The displacement compresses the spring 830. Additionally, the displacement dis-aligns the sleeve spool return port hole 812 and cage return port hole 852. Thus the return port 850 is no longer in fluid communication with the interior of the valve. Additionally, the displacement causes the sleeve spool supply port hole 814 and cage supply port hole 842 to come into alignment. Thus, the supply port 840 is now in fluid communication with the interior of the valve. The communication with the supply port increases the control pressure such that the difference in area of the left end minus the right end feeds a force back to the solenoid 870. Thus the solenoid input may proportionally reduce the supply pressure to a desired control pressure. The near radial flow through hole 842 and 852 allows high flows with minimal closing flow forces. The orifices 880 communicating the control pressure to the left end area 890 and orifice 885 to the right end plus the flow flare element 895 may be sized such that flow may be smoothly controlled up to the pre-determined high flow capacity limit.

FIG. 9B illustrates a view of the "on" valve 800 looking into the supply port 940, return port 950, and control port 960.

FIG. 10A illustrates an alternative embodiment of a valve 1000 according to an embodiment of the present invention. FIG. 10A shows a valve 1000 having a sleeve spool 1010, a cage 1020, a spring 1030, a supply port 1040, a return port 1050, a control port 1060, and solenoid 1070. The cage 1050 includes a cage return port slot and/or hole 1052 at a cage return port location, a cage supply port slot and/or hole 1054 at a cage supply port location, and cage control port slot and/or holes 1056 at a cage control port location. The sleeve spool 1010 includes a sleeve spool return port slot and/or hole 1012 at a spool return port location, a sleeve spool supply port slot and/or hole 1014 at spool supply port location, and sleeve spool control port slot and/or holes 1016 at a spool control port location. FIG. 10 also shows an orifice 1080, left end spool chamber 1090, flow force flare elements 1092 and 1094, and right end of the spool 1086.

FIG. 10B illustrates a view of the "off" valve 1000 looking into the supply port 1040, return port 1050, and control port 1060.

FIGS. 10A and B Illustrate the solenoid off position for the valve 1000. In this position, the sleeve spool return port hole 1012 and cage return port hole 1052 at least partially overlap to allow fluid transfer through both the sleeve spool return port hole 1012 and cage return port hole 1052 so that the return port 1050 and the interior of the valve are in fluid contact. Additionally, the control port 1060 is also in fluid connection with the interior of the valve through the sleeve spool control port holes 1016 and cage control port holes 1056. Conversely, the sleeve spool supply port hole 1014 and cage supply port hole 1052 are not in alignment, so the interior of the valve and the supply port are not in fluid communication. Control pressure is communicated through orifice 1080 to the larger area left end spool chamber 1090. Control flow contacts flow force flare element 1092 and or 1094. Control pressure is communicated through orifice 1085 to the smaller area right end of the spool 1086.

FIGS. 11A and B illustrate the valve 1000 of FIG. 10 in a solenoid on position. As shown in FIG. 11A, the solenoid 1070 has displaced the sleeve spool 1010 by a solenoid displacement distance 1172. The displacement compresses the spring 1030. Additionally, the displacement dis-aligns the sleeve spool return port hole 1012 and cage return port hole 1052. Thus the return port 1050 is no longer in fluid communication with the interior of the valve. Additionally, the displacement causes the sleeve spool supply port hole 1014 and cage supply port hole 1054 to come into alignment. Thus, the supply port 1040 is now in fluid communication with the interior of the valve. Also, the control port 1060 remains in fluid connection with the interior of the valve through the sleeve spool control port holes 1016 and cage control port holes 1056. The communication with the supply port increases the control pressure such that the difference in area of the left end minus the right end feeds a force back to the solenoid 1070. Thus the solenoid input may proportionally reduce the supply pressure to a desired control pressure. The near radial flow through holes 1012 and 1014 allows high flows with minimal closing flow forces. The orifices 1080 communicating the control pressure to the left end area 1090 and orifice 1085 to the right end 1096 plus the flow flare elements 1092 and 1094 may be sized such that flow may be smoothly controlled up to the pre-determined high flow capacity limit.

FIG. 11B illustrates a view of the "on" valve 1000 looking into the supply port 1040, return port 1050, and control port 1060.

FIGS. 12A, 12B, 13A, 13B, and 14 illustrate an alternative embodiment of a multiple valve system 1200 according to one embodiment of the present invention. As shown in FIGS. 12A and 12B, the multiple valve system 1200 includes five control ports 1210-1214, as well as a return port 1222 and an alternate return port 1220 and a supply port 1230 and an alternate supply port 1232.

Figure 13A:
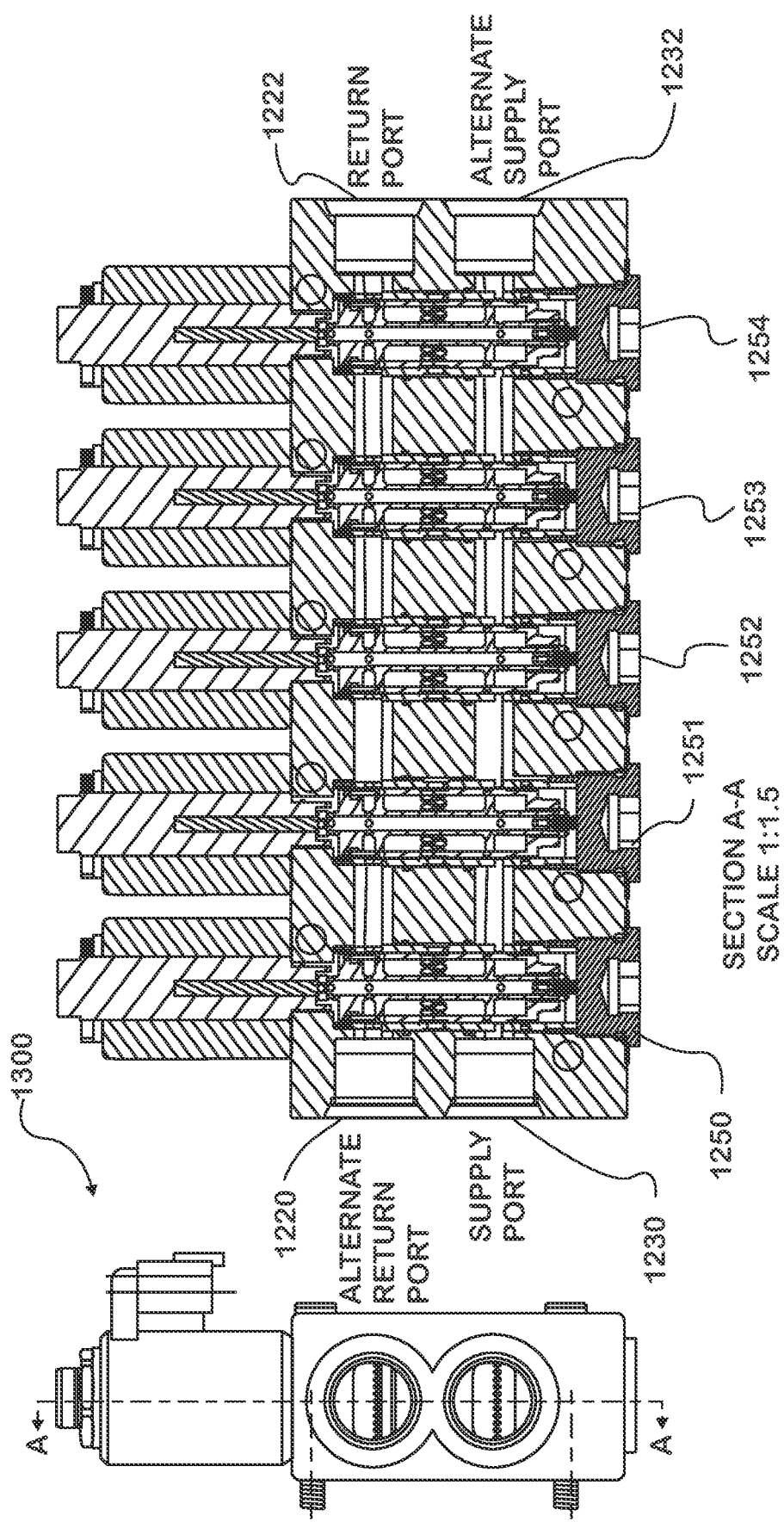
Figure 13B:
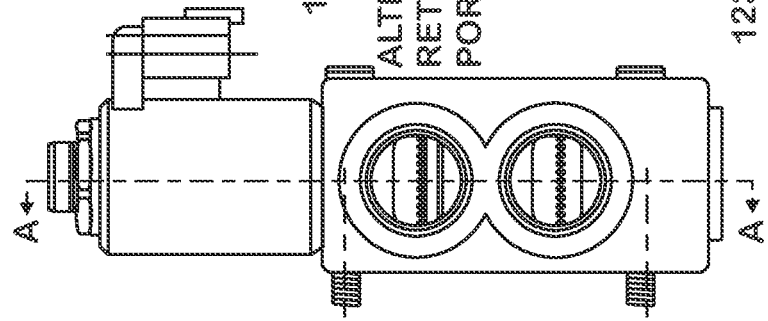
Figure 14:
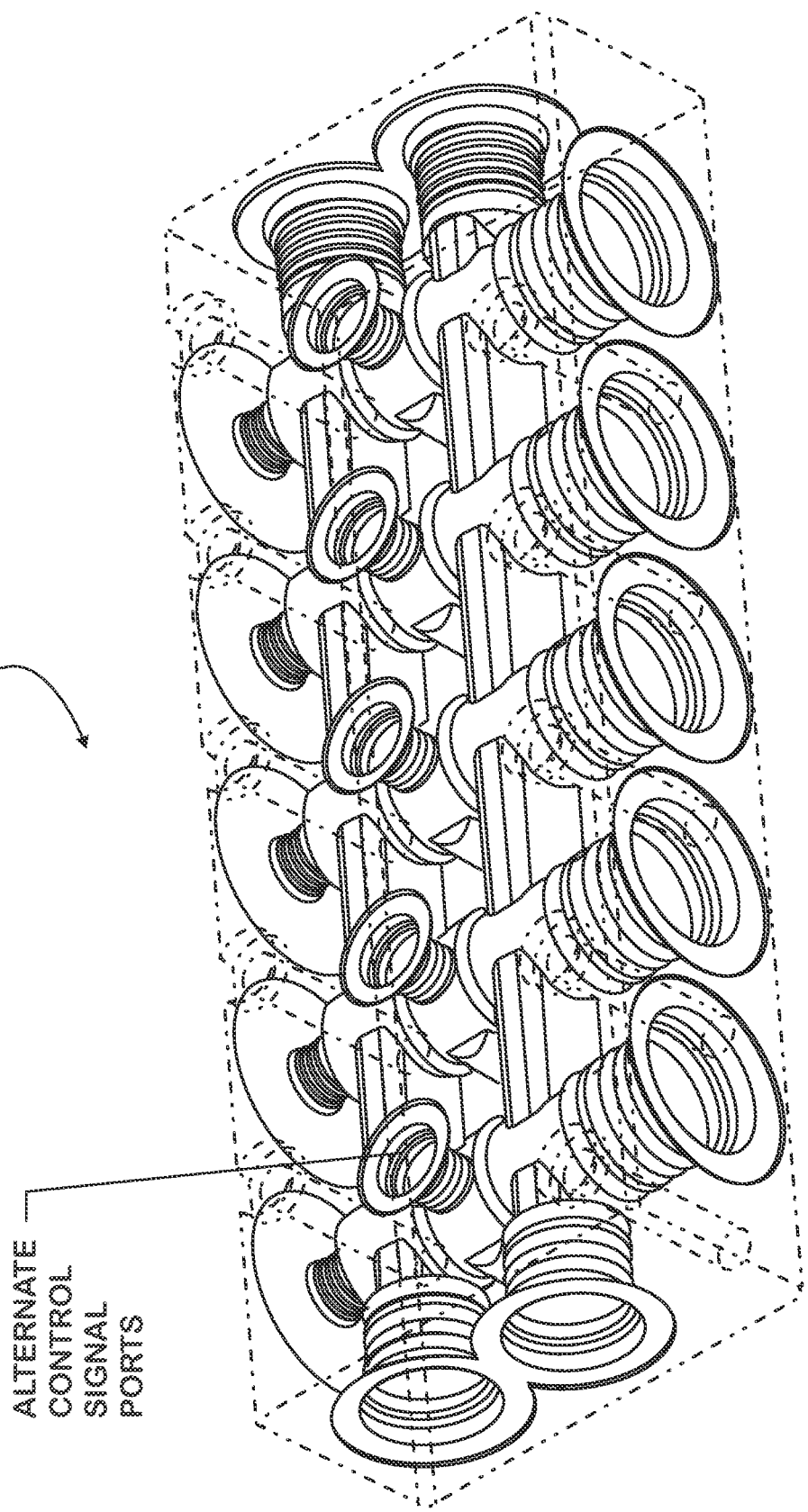

As may be readily seen in the cut-away view of FIG. 13A, each of the five control ports 1210-1214 is associated with its own valve 1250-1254. Each valve is generally similar to the valves of FIGS. 10-11, but multiple valves are positioned in series in the embodiment of FIGS. 12-14. Additionally, the return port 1222 and alternate return port 1220 are in fluid communication with all of the valves when the valves are in the solenoid off position. Similarly, the supply port 1230 and alternate supply port 1232 are in fluid communication with all of the valves when the valves are in the solenoid on position.

One or more embodiments of the present invention address the concerns mentioned above by reducing the closing flow forces and then transferring these flow forces to an end-chamfer and finally compensating the flow forces with a flare element thus allowing the valve capacity to be significantly increased. Testing on a current stepped bore spool style pressure reducing valve indicated that after the modulation range the valve acted like a fixed area restriction. The area of this restriction is much smaller than the full open area of the valve.

Figure 15:
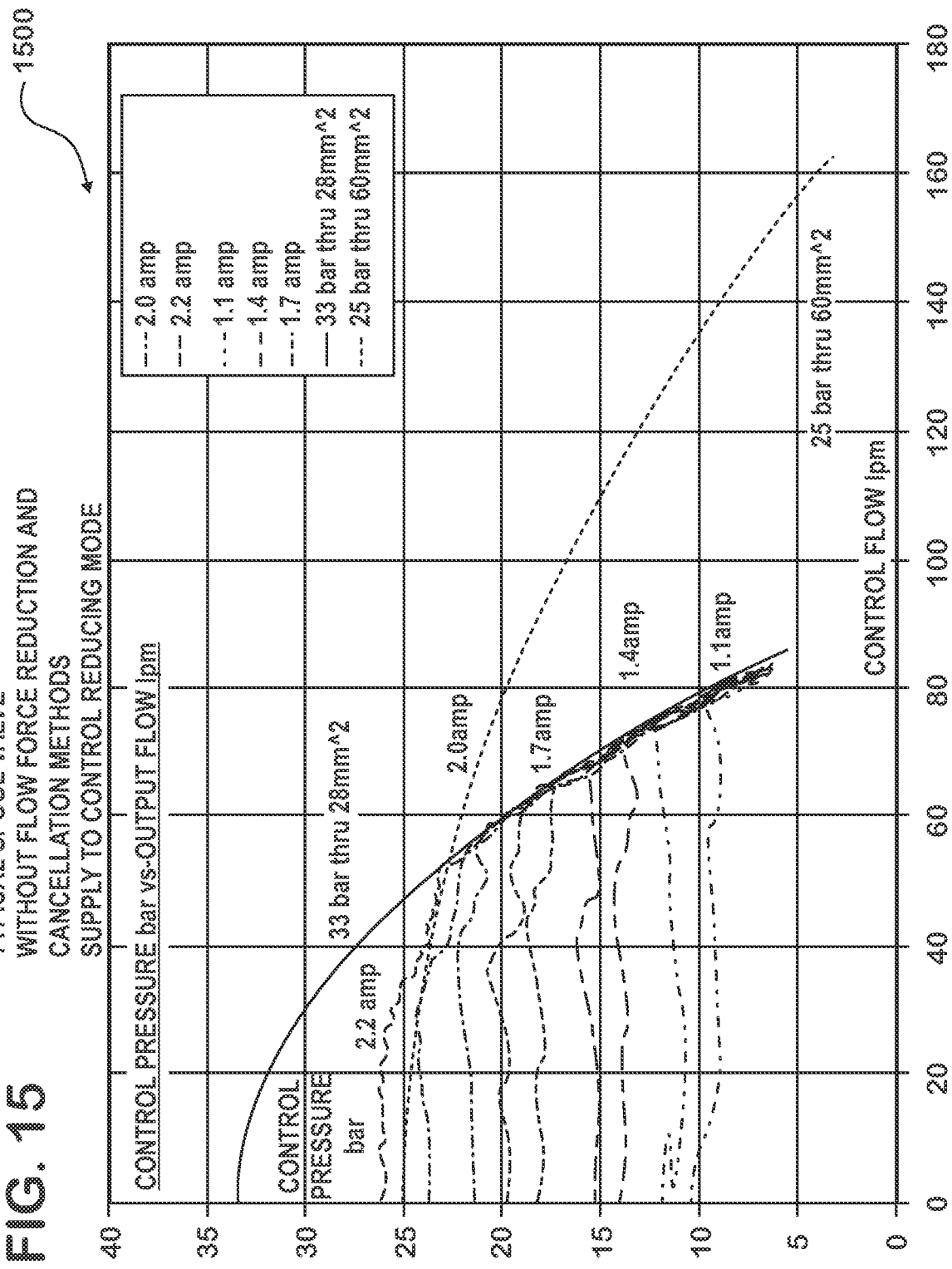
FIG. 15 illustrates a curve in showing the valve closing at 28 mm$^2$ when the full open area is really 60 mm$^2$.

For example, FIG. 15 illustrates a curve in showing the valve closing at 28 mm^2 when the full open area is really 60 mm^2. This indicates that the flow forces prevented the valve from opening past a partial shift point. A higher force solenoid may be configured in a valve instead of the current solenoid, but this causes excess cost, package size and coil heat.

Figure 16:
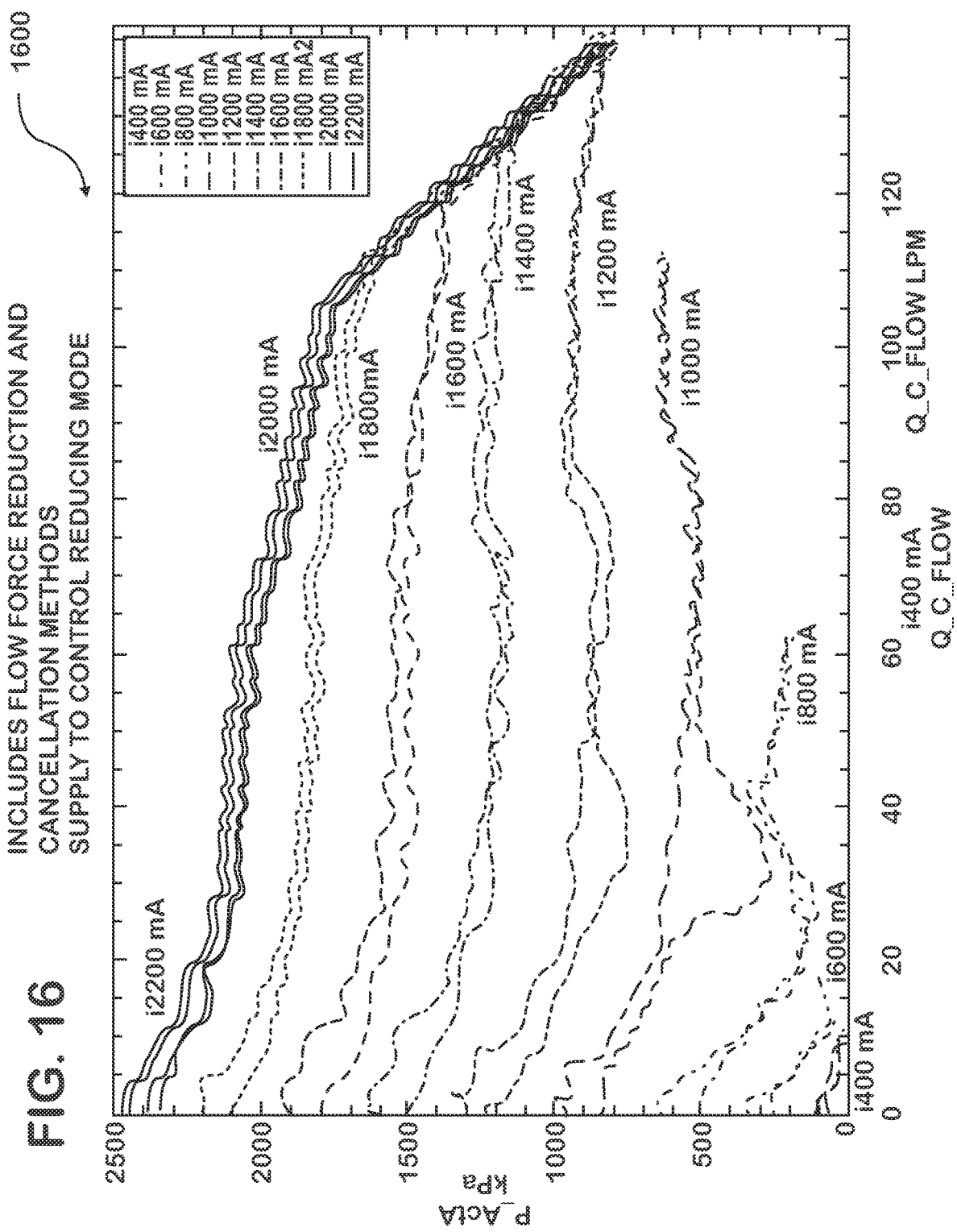
FIG. 16 illustrates a curve showing the pressure versus flow performance of an embodiment of this invention indicating that the larger metering areas do open resulting in lower pressure drop and high flow capacity.

FIG. 16 illustrates a curve showing the pressure versus flow performance of an embodiment of this invention indicating that the larger metering areas do open resulting in lower pressure drop and high flow capacity.

One or more embodiments of the present invention address this issue by using a stepped bore configuration to reduce the solenoid size and increase the flow capacity of the valve. Then the actual flow capability of the valve is increased by the flow force reduction and cancellation methods. First, this system reduces the flow forces by configuring a sleeve style spool inside a sleeve style cage. This allows the flow to be directed into and out of the valve nearly radially. This may then use significantly smaller radial holes.

For open area there typically have to be many more holes than what is typically configured. This adds cost and risk of burrs but is done to reduce the flow forces. The hole size is preferably close to the width of the actual flow path. This generates nearly pure radial flow lowering the typical closing flow force transmitted to the spool since the contact is normal to the spool and does not have much angle to generate flow force. In order for the spool to then have the flow exit on another position or area on the valve, the spool has the near radial flow translated to axial flow inside the profile of the spool.

Next, a control signal is connected to one or both of the end chambers. This signal passage then transfers the slight pressure increase due to the flow direction change from the spool to the fixed end chamber. The spool would then have an equal and opposite pressure force that cancels the slight pressure increase due to the flow direction change that is within the profile of the spool. Finally one or more flare elements on the center adapter that are affixed to the spool may induce a flow direction change slight pressure increase. This slight pressure increase then adds to the overall spool forces. A typical closing flow force may then be counter acted by the force generated by the flare.

The size and position of the one or more flares may be adjusted such that the typical closing flow force is reduced to the point where the flow capacity is significantly larger than what it would be without the above methods and systems. Obtaining a larger flow capability then allows a smaller more cost effective valve package and also allows smaller solenoid current demand. This in turn may reduce the current driver size and reduce the system heat that may typically reduce the life and performance of proportional solenoids. This also allows valves to be stacked together and/or remote mounted to reduce size and number of manifolds needed in circuits.

Implementation Examples

Construction equipment, automotive, aeronautical and industrial applications all typically use proportional and on/off valves. These valves may be pressure control or area control devices. The flow forces in these valves limit the maximum flow usable in the various applications.

The flow force reducing and cancellation methods shown in the present valve are beneficial in these valve applications.

Construction equipment and automotive applications need valves that are cost and size competitive. In this regard, the current driving systems are limited to by the cost, size and heat of the current level needed. The larger flow capacity offered by the present valve allows smaller solenoids to be used.

Construction equipment may eliminate stages of valves once the capacity is higher.

Also remote control on the actual pumps, motors and cylinders reduces the manifolds needed in a circuit.

The aeronautical applications also need valves that are cost effective. But aeronautical application have an added benefit of the lighter weight offered by the present valve.

The industrial valve applications typically would benefit by the lower heat and longer life offered by the present valve.

Also smooth operation and fast response are also benefits offered by the present valve for various valve applications mentioned above and for other applications known in various fields of art.

In one or more embodiments, the spool holes or multiple small holes in the spool may be more expensive to machine due to risk of burrs, but may reduce flow force. For example, the center adapter may cancel some flow force by sending signal pressure to the end chamber. In one embodiment, the flow forces may be a hydraulic push that pushes the spool into a closing position. In another embodiment, the flare may be an added element to fine tune flow forces. For example, the flow may hit the flare and transmit pull or push force to the metering spool element. The size and position of the flare may then fine tune the net flow forces to be nearly zero or biased towards opening or closing force depending on application response and or stability requirements.

In one or more embodiments, the present valve provides a bigger bore, radial holes, signal to end chambers, and/or the flare in order to better modulate flow forces and/or pressure.

Additionally, in one or more embodiment, the valve may be operated to provide flow force reductions and cancellation methods during a supply-to-control flow and/or during a relieving mode where flow is control-to-return.

In one or more embodiments of the present invention, there may be a greater of lesser number of radial holes as shown in the attached figures. For example, in one embodiment, the supply conduit of the valve may employ 24 holes. In other embodiments, four holes up to dozens of holes may be employed.

Additionally, holes of greater or lesser size may be employed. Additionally, the holes may be non-uniform is size and/or radial spacing.

Also, in one or more embodiments, the radial holes may be sized relative to the stroke available. For example, when the size of the stroke is 3 mm, which may provide a shift direction of 1.5 mm, then the holes may be 30% larger than the stroke available for shift direction. In another example, the stroke may be 2.2 mm with a 1.1 mm stroke and holes at the size of the stroke or up to 50% larger, with a preferred embodiment being at or around 30% larger. Additionally, the size of the holes relative to the stroke may be from a smaller diameter of any of same size, 10% smaller, 20% smaller, 30% smaller and 40% smaller to a larger diameter of 10% larger, 20% larger, 30% larger, 40% larger, and 50% larger.

Additionally, one or more embodiments of the present invention may provide over 120 liters per minute using smaller push elements that without these flow force reduction and cancelation and fine tuning methods has 45 liters per minute capacity.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A hydraulic valve including:
   a spool, wherein said spool includes a spool first slot forming an aperture through said spool at a spool first slot position and a spool second slot forming an aperture through said spool at a spool second slot position;
   a cage surrounding said spool, wherein said cage includes a cage first slot at a cage first slot position and a cage second slot at a cage second slot position,
   wherein, when said valve is in an on position, said spool first slot and said cage first slot are angularly aligned to allow fluid to pass through both said spool first slot and said cage first slot,
   wherein, when said valve is displaced to an off position, said spool second slot and said cage second slot are angularly aligned in parallel to allow fluid to pass through both said spool second slot and said cage second slot,
   wherein said cage second slot receives fluid from only said spool second slot; and
   a spring positioned between said spool and cage, wherein said spring holds the angular alignment of the spool relative to the cage so that said spool first slot and said cage first slot are aligned and so that said spool second slot and said cage second slot are aligned,
   wherein said spring engages an interior groove of said cage and an exterior reduced diameter portion of said spool,
   wherein the outermost diameter of said spring abuts an interior of said interior groove of said cage, and
   wherein said spool first slot includes an additional hole, wherein said hole is located in the center of said slot, wherein said slot includes a long side and a short side, wherein said hole has an outermost diameter larger than the width of said short side.

2. The valve of claim 1 wherein a plurality of slots are located at said spool first slot position.

3. The valve of claim 1 wherein a plurality of slots are located at said cage first slot position.

4. The valve of claim 1 wherein a plurality of slots are located at said spool second slot position.

5. The valve of claim 1 wherein a plurality of slots are located at said cage second slot position.

6. The valve of claim 1 wherein said spool includes a dampening orifice.

7. The valve of claim 1 wherein said cage is formed as part of a surrounding casing.

* * * * *